(12) United States Patent
Barbosa et al.

(10) Patent No.: US 11,034,617 B2
(45) Date of Patent: Jun. 15, 2021

(54) STEEL PRODUCT, CEMENT MANUFACTURING PROCESS AND CEMENT

(71) Applicant: Gerdau S.A., Rio de Janeiro (BR)

(72) Inventors: Marina Reno Barbosa, Belo Horizonte (BR); Alexandre de Matos, Conselheiro Lafaiete (BR); Edson Geraldo da Silva, Ouro Branco (BR); Arnaldo Dias de Andrade, Belo Horizonte (BR); Ruben Antonio Sole, Belo Horizonte (BR); Fernando Gabriel da Silva Araujo, Ouro Preto (BR); Jefferson Januario Mendes, Ouro Preto (BR); Fernando Leopoldo von Krueger, Ouro Preto (BR)

(73) Assignee: Gerdau S.A., Rio de Janeiro (BR)

( * ) Notice: Subject to any disclaimer, the term of this patent is extended or adjusted under 35 U.S.C. 154(b) by 654 days.

(21) Appl. No.: 15/849,038

(22) Filed: Dec. 20, 2017

(65) Prior Publication Data

US 2018/0170805 A1  Jun. 21, 2018

(30) Foreign Application Priority Data

Dec. 21, 2016  (BR) .......................... 102016030153-0

(51) Int. Cl.
| | |
|---|---|
| C04B 5/00 | (2006.01) |
| C04B 7/14 | (2006.01) |
| C04B 28/08 | (2006.01) |
| C04B 5/06 | (2006.01) |
| C04B 7/147 | (2006.01) |
| C21B 3/08 | (2006.01) |
| C04B 7/40 | (2006.01) |
| C04B 7/00 | (2006.01) |
| C04B 7/34 | (2006.01) |

(Continued)

(52) U.S. Cl.
CPC ................ *C04B 5/06* (2013.01); *C04B 7/147* (2013.01); *C04B 7/40* (2013.01); *C04B 28/082* (2013.01); *C21B 3/08* (2013.01); *C04B 2103/52* (2013.01); *Y02P 40/10* (2015.11); *Y02W 30/91* (2015.05)

(58) Field of Classification Search
USPC ................................................. 106/638, 789
See application file for complete search history.

(56) References Cited

FOREIGN PATENT DOCUMENTS

| | | | |
|---|---|---|---|
| JP | 3338851 B2 | | 10/2002 |
| KR | 101167134 B1 | * | 7/2012 |
| KR | 101167134 B1 | | 7/2012 |

\* cited by examiner

*Primary Examiner* — James E Mcdonough
(74) *Attorney, Agent, or Firm* — Alston & Bird LLP

(57) ABSTRACT

The present invention relates to a novel cementitious product produced from steelworks slag additivation to obtain material having properties suitable for use in the partial or total clinker replacement for the production of different types of cement. The process, which is also object of this invention, aims to adapt the properties of steelworks slag, by means of thermochemical treatment, including and preferably, but not only, still in the liquid steelworks slag pot, taking advantage of the thermal input of steel processing, to form a greater amount of alite (essential compound to increase pozzolanicity), under controlled conditions. After additivation, preferably, but not exclusively, the additivated steelworks slag is subjected to quenching, comminution and concentration to stabilize the alite fraction, to release the present phases and to remove any excess contaminants, such as metallic iron.

8 Claims, 4 Drawing Sheets

(51) Int. Cl.
*C04B 28/00* (2006.01)
*C04B 32/00* (2006.01)
*C04B 103/52* (2006.01)

STEEL PRODUCT, CEMENT MANUFACTURING PROCESS AND CEMENT

CROSS REFERENCE TO RELATED APPLICATIONS

This application claims priority to Brazilian Application No. 102016030153-0, filed Dec. 21, 2016, the contents of which as are hereby incorporated by reference in their entirety.

BACKGROUND

Technical Field

The present invention relates to the additivation of steelworks slag to obtain material having properties suitable for use as a feedstock for the production of different types of cement.

Today, in Brazil, steel slag after processing is used in different applications, such as road paving, rail ballast, filling material and, in agriculture, as corrective of soil acidity or as fertilizer.

For the different applications discussed above, a preparation and a treatment, according to their use, must be previously made. It is worth noting that added steelworks slag is not currently used Brazil as raw material for cement production, a product with higher added value than the previous ones.

Description of Related Art

The technical problem solved by the present invention is the utilization of the steelworks slag, by means of additivation to the liquid steelworks slag pot, followed by quenching, to adjust its composition, in order to become cementitious material, with high pozzolanicity, as a function of the maximization of the alite content in the final material. The main function of the product is the partial or total replacement of the clinker, being able to produce a pozzolanic cement of high efficiency and still aid in the reduction of $CO_2$ emissions.

The closest prior-art documents are KR101167134B1, JP3338851B2 and GEYER, R. T., "Estudo sobre a potencialidade de uso das escórias de aciaria como adição ao concreto" ("Study on the potentiality of use of steel slag as addition to concrete"), (2001), Porto Alegre. The first two documents deal only with electric arc furnace slag, with correction of composition added to the furnace load, directly, and generation of an amorphous slag, without mention of the pozzolanic potential and the alite content. The third one addresses the use of the pot oven slag, without specifying additives, without mention to the pozzolanic potential and the alite content.

BRIEF DESCRIPTION OF THE FIGURES

For greater clarity and understanding of the object of the present invention, it is illustrated in a figure which represents an embodiment of the invention by way of illustration only.

BRIEF SUMMARY

Figure 1:
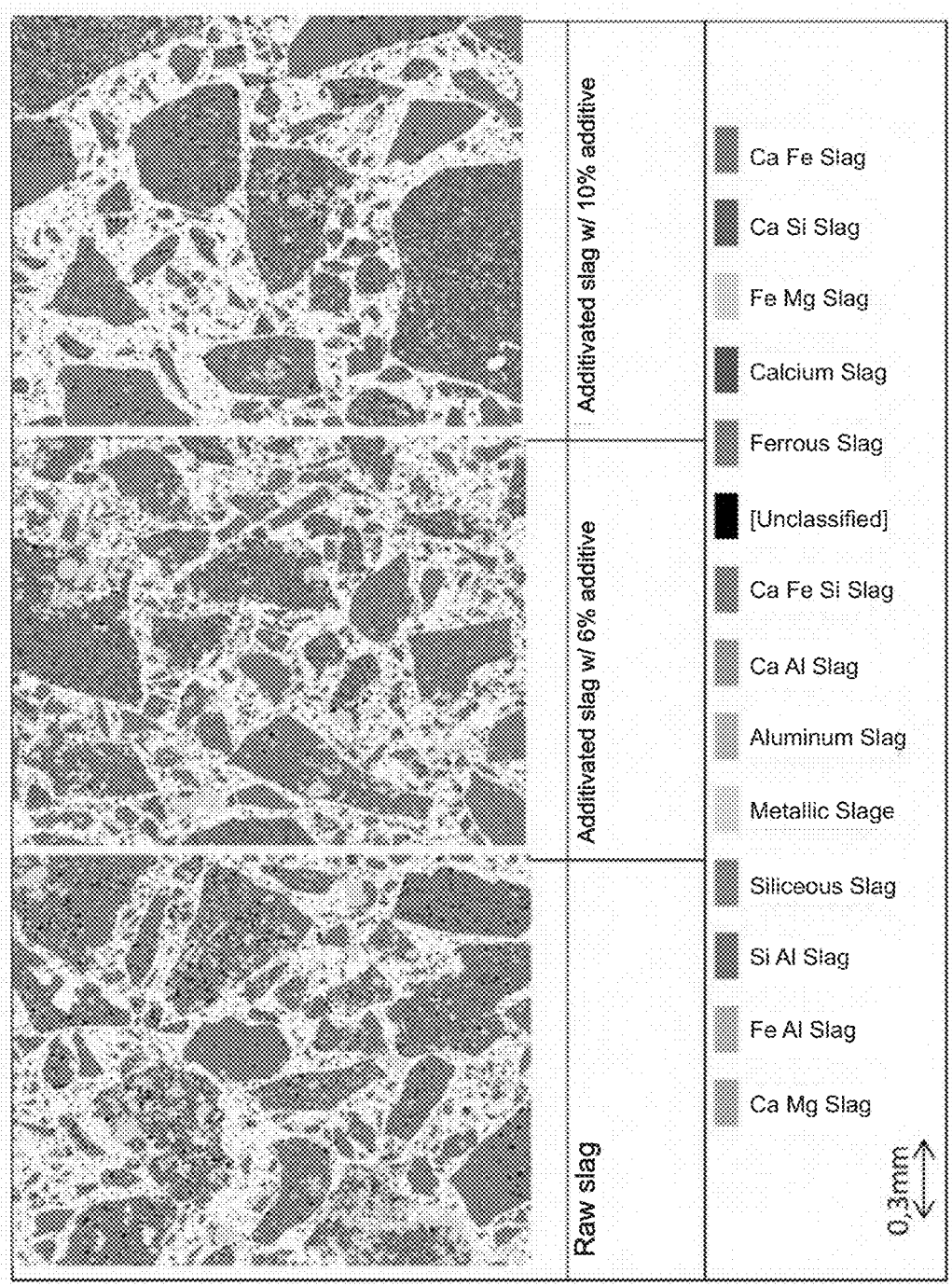
FIG. 1 represents the different phases of the raw and additivated slag, with 6 and 10% silica additive, respectively.
Figure 2:
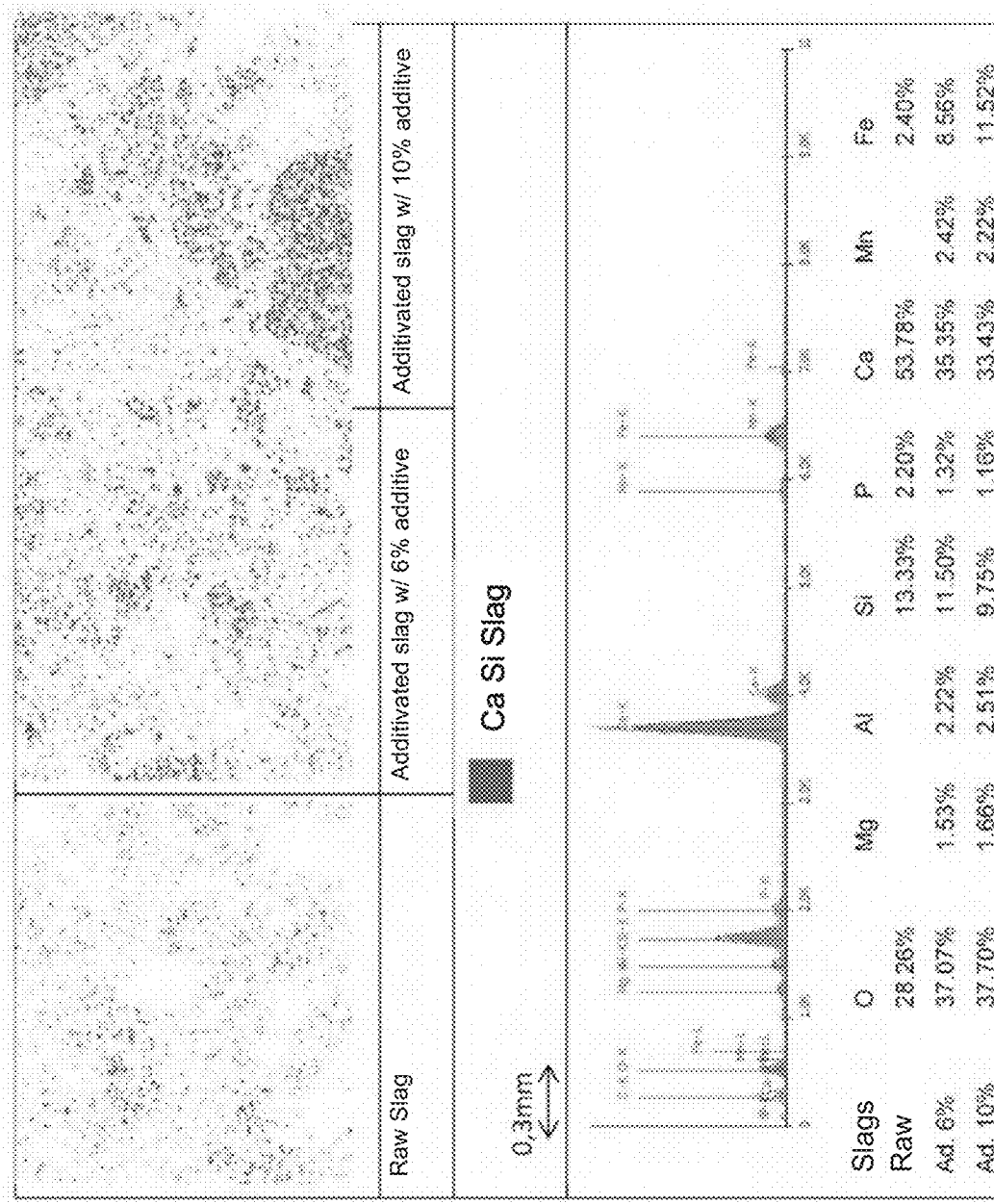
FIG. 2 shows the Ca—Si phase for the three samples analyzed, as well as the spectrum with the main compounds.
Figure 3:
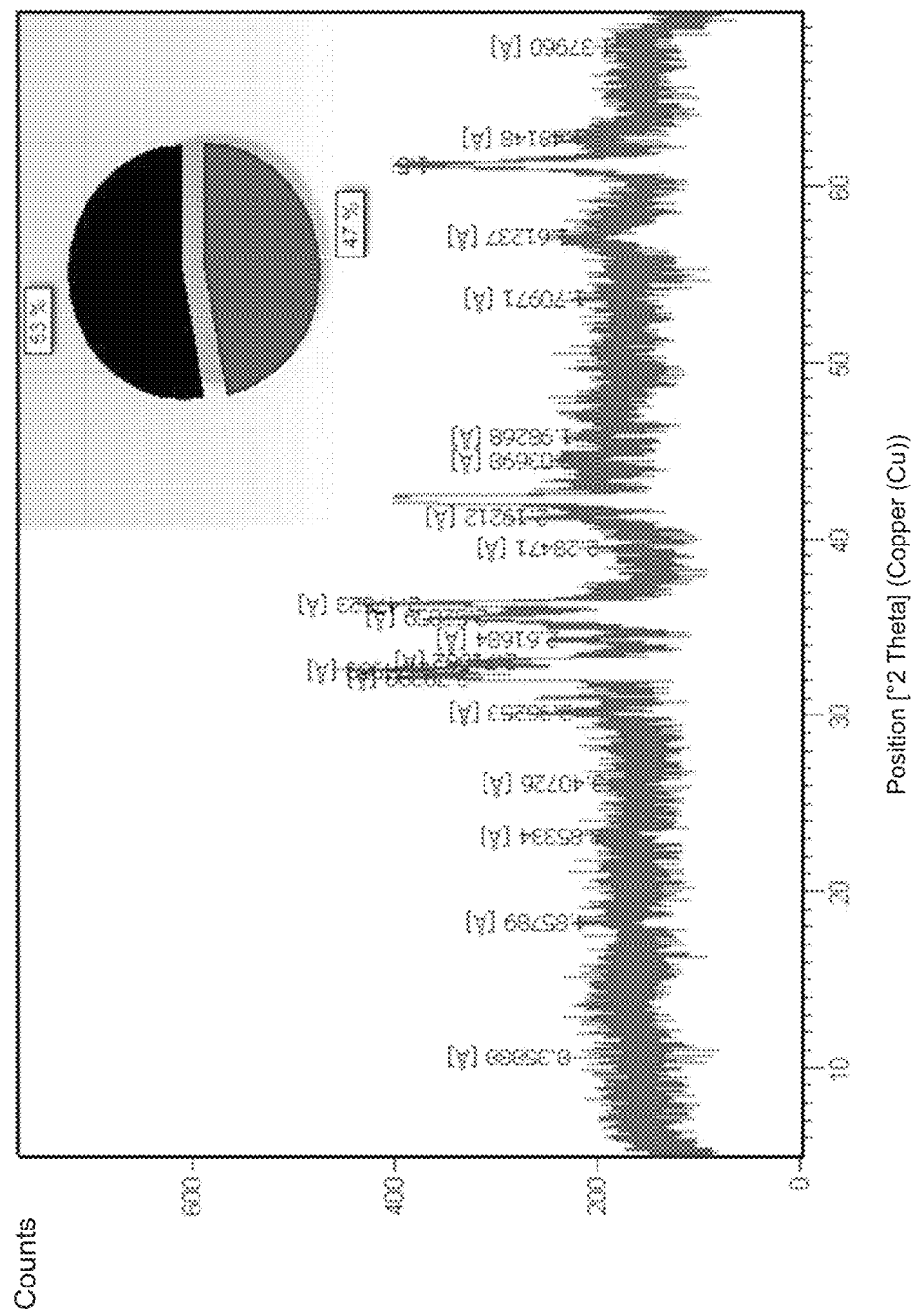
FIG. 3 shows the Alite and Belite XRD spectrum of the 10% additivated slag sample.

One of the main objects of the present invention is to adapt the properties of the steelworks slag, by means of thermochemical treatment, including and preferably, but not only, still in the liquid steelworks slag pot, taking advantage of the thermal input of steel processing, forming a greater amount of alite (essential compound to increase pozzolanicity), under controlled conditions, and subsequent quenching, comminution and concentration, so that the added slag can replace the clinker, maintaining within the normalized ranges the main properties of cement, including compressive strength, percentage of free lime, percentage of metallic Fe and percentage of Alite.

This new material, the additivated slag from steelworks, applied to the cement production, has a market value superior to other steelworks slag applications available today in the country. In addition, the use of additivated slag as cementitious additives promotes the reduction of the amount of $CO_2$ released into the environment by partial replacement of the clinker. The decrease in $CO_2$ released, promoted by the use of the new product reaches 554 kg of $CO_2$/ton of replaced clinker, according to mathematical/theoretical equivalence calculations, from the cement production and replacement with the new product.

DETAILED DESCRIPTION OF VARIOUS EMBODIMENTS

Steelworks slag may be generated from the LD converter, an acronym for Linz-Donawitz, or from the electric arc furnace (FEA or EAF) of steelworks.

Table 1 (IAB 2012) provides examples of reference chemical composition for steelworks slag produced by two classical processes (weight percent average), respectively.

TABLE 2

| | Reference chemical composition for steel slag (weight percent average). | | | | | |
|---|---|---|---|---|---|---|
| Process | CaO | $SiO_2$ | MgO | FeO | MnO | CaO/$SiO_2$ |
| LD Acid Slag | 6.0-35.0 | 7.0-16.0 | 1.0-9.0 | 20.0-30.0 | 3.0-7.0 | 2.8-3.6 |
| EAF Acid Slag | 30.0-35.0 | 15.0-20.0 | 8.0-12 | 25-35 | 3.0-6.0 | 1.7-2.0 |

There are important differences in the CaO content of the slags produced by the two processes, with the LD steelworks slag having between 6.0 and 35% CaO and the electric steel slag between 30 and 35% CaO.

Silica, $SiO_2$, for LD steelworks slag varies in a range from 7.0 to 16.0%, while for the electric steelworks slag it varies from 15 to 20%. MgO for LD steel slag varies from 1 to 9% and in the electric furnace slag, it varies from 8 to 12%, which depends on the type of steel produced.

The briefly described objective can be achieved by the additivation of slag with silica additives, such as sodium metasilicate or materials with high content of $SiO_2$, which react with free lime present in the slag, obtaining tricalcium silicate (Alite), which is the main component of the cement.

For the additivation of raw steelworks slag, silica additives should be used, having been specially selected and tested because they are low cost, but not only granitoid and quartz-biotite shale material, which have the typical compositions shown in Tables 2 and 3, respectively.

TABLE 2

Granitoid additive, with high silica content

| Óxidos | Global | 10# | 16# | 35# | 65# | 100# | 150# | 200# | 270# | +325% | −325# |
|---|---|---|---|---|---|---|---|---|---|---|---|
| SiO$_2$ | 68.73% | 67.35% | 65.10% | 67.95% | 90.40% | 88.70% | 89.63% | 88.27% | 87.96% | 68.87% | 66.78% |
| Al$_2$O$_3$ | 23.66% | 25.75% | 27.38% | 25.14% | — | — | — | — | — | 23.12% | 25.18% |
| K$_2$O | 3.27% | 3.09% | 3.37% | 3.13% | 4.04% | 4.29% | 4.18% | 4.65% | 5.39% | 3.43% | 3.74% |
| SO$_3$ | 1.62% | 1.14% | 1.25% | 1.22% | 2.18% | 2.52% | 2.25% | 2.31% | 2.36% | 1.67% | 1.27% |
| CaO | 1.36% | 1.45% | 1.60% | 1.38% | 1.58% | 1.68% | 1.75% | 1.84% | 2.15% | 1.50% | 1.37% |
| Fe$_2$O$_3$ | 0.67% | 0.54% | 0.59% | 0.49% | 0.79% | 1.02% | 1.00% | 1.22% | 1.23% | 0.84% | 1.01% |
| Ferro Total | 0.47% | 0.38% | 0.41% | 0.35% | 0.55% | 0.71% | 0.70% | 0.85% | 0.86% | 0.59% | 0.71% |
| BaO | 0.38% | 0.38% | 0.42% | 0.46% | 0.46% | 0.84% | 0.51% | 0.54% | 6.03% | 0.42% | 0.41% |
| WO$_3$ | 0.17% | 0.17% | 0.16% | 0.14% | 0.32% | 0.79% | 0.51% | 0.93% | — | — | — |

Óxidos = Oxides
Ferro Total = Total Iron

TABLE 3

Quartz-biotite shale additive, with high silica content

| Óxidos | Global | 10# | 16# | 35# | 65# | 100# | 150# | 200# | 270# | +325# | −325# |
|---|---|---|---|---|---|---|---|---|---|---|---|
| SiO$_2$ | 69.11% | 65.47% | 65.27% | 65.55% | 92.23% | 90.39% | 92.20% | 92.48% | 89.34% | 87.87% | 66.74% |
| Al2O3 | 24.02% | 27.85% | 28.31% | 27.96% | — | — | — | — | — | — | 25.42% |
| K2O | 1.93% | 2.13% | 2.04% | 2.05% | 1.99% | 2.03% | 2.06% | 1.17% | 3.20% | 4.15% | 2.47% |
| CaO | 1.70% | 1.84% | 1.98% | 1.97% | 1.78% | 1.84% | 1.84% | 1.68% | 2.51% | 2.66% | 1.82% |
| SO3 | 1.82% | 1.35% | 1.22% | 1.21% | 2.37% | 1.44% | 1.44% | 2.11% | 2.86% | 2.49% | 1.53% |
| Fe2O3 | 0.81% | 0.67% | 0.65% | 0.64% | 0.67% | 0.93% | 0.93% | 0.80% | 1.46% | 2.14% | 1.49% |
| Ferro | 0.56% | 0.47% | 0.45% | 0.45% | 0.47% | 0.65% | 065% | 0.56% | 1.02% | 1.50% | 1.04% |

Óxidos = Oxides
Ferro = Iron

The material with a high content of tricalcium silicate, the additivated steelworks slag, can replace the clinker up to a percentage that generates a cement with characteristics that meet the standard specifications for the intended type.

Figure 4:
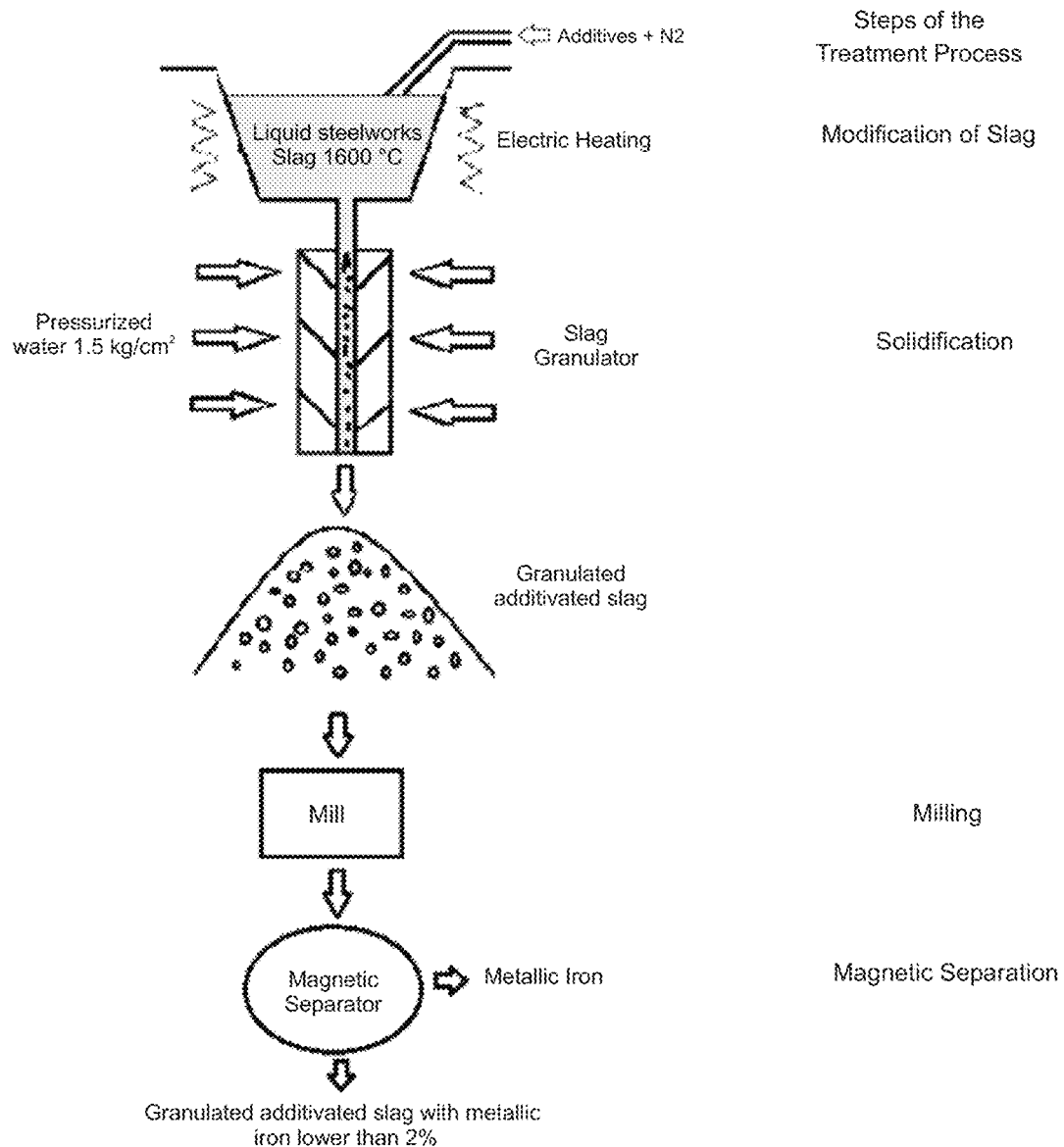
FIG. 4 is a brief description of the process.

The process consists of the following steps, shown in FIG. 4:

Modification of liquid slag by the additivation of silicates and/or metasilicates into the steel slag pot;
Solidification, preferably by quenching;
Comminution;
Magnetic separation.

In the first step, the treatment is performed by treating the liquid slag, preferably, but not only, directly in the liquid slag pot, in the temperature range of 1200 to 1800° C., with silica additives, injected in the ratio suitable for reaction with the free lime present.

In this stage of the process, tricalcium silicate (C3S-Alite) is formed by the reaction of free lime with dicalcium silicate (C2S-Belite) already formed in reaction with the siliceous additive.

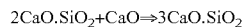

2CaO.SiO$_2$+CaO⇒3CaO.SiO$_2$

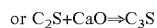

or C$_2$S+CaO⇒C$_3$S

Subsequently, solidification is preferably carried out by quenching. A typical quenching process applied to slag and suitable for the present process may be, for example, water-under-pressure granulation, in order to decrease its temperature suddenly, by directly obtaining granulated additivated steelworks slag, with high moability, with the property of still retaining the high content of alite formed at high temperature, avoiding its decomposition in a slow cooling process.

This step is important, since the coarse-grained granulation will facilitate the subsequent crushing and milling to increase the specific surface area and to release the metallic iron to be withdrawn in subsequent steps.

After milling of the granulated additivated slag, a material with a specific Blaine surface suitable for the manufacture of cement should be expected.

The material obtained from milling for the reduction of metallic iron content needs to be concentrated, for example, by magnetic separation, to reach the required specifications of metallic iron content of less than 2% by weight, for use as feedstock, in order to obtain cement. In experiments with the process object of this patent application, Table 4 shows that the slags added with 6 and 10% of siliceous material, after comminuted and concentrated, reached 1.35% of metallic iron.

TABLE 4

Chemical analysis of metallic iron in raw and additivated steelworks slag, after comminution and magnetic separation, in the 1000 Gauss field.

| Steelworks slag | Metallic iron % |
|---|---|
| Raw | 1.57 |
| Additivated slag 6% | 1.35 |
| Additivated slag 10% | 1.35 |

Table 5 presents semiquantitative results of steelworks slag phases, analyzed by deterministic electron microscopy, for raw and additived steelworks slag, with 6 and 10% by weight of siliceous additive. A significant increase of the "Ca Si" phase is observed, with the increase of the additivation. The elements present in each phase are those with contents higher than 10%.

TABLE 5

Mineralogical analysis by deterministic electron microscopy of raw and additivated steelworks slag after comminution and magnetic separation in a 1000 Gauss field.

| Mineral/Mass [%] | Raw steel slag | Added steel slag w/ 6% | Added steel slag w/ 10% |
|---|---|---|---|
| CaFe-phase | 74.49 | 47.1 | 47.28 |
| CaFeSi-phase | 2.51 | 15.84 | 18.28 |
| CaSi-phase | 6.01 | 15.82 | 20.95 |
| FeMg-phase | 13.01 | 8.43 | 6.11 |
| Ferrous-phase | 2.44 | 10.22 | 6.45 |
| Calcium-phase | 1.32 | 1.88 | 0.74 |
| Remainder | 0.23 | 0.7 | 0.19 |

Table 6 shows the results, by X-ray diffraction, of belite and alite contents, of the samples of raw and added slag, with 6% and 10%, respectively.

TABLE 6

Alite and Belite contents of raw and additivated steelworks slag, after comminution and magnetic separation, in a 1000 Gauss field.

| Steelworks slag | Belite % | Alite % |
|---|---|---|
| Raw | 77.00 | 0.00 |
| Additivated 6.00% | 62.00 | 38.00 |
| Additivated 10.00% | 53.00 | 47.00 |

It is verified that, as the percentage of additivation increases, a higher percentage of alite is obtained, and the determinant factor being the percentage of free CaO that the steelworks slag has before being added.

In the procedure, it was possible to obtain free lime in the steelworks slag after thermochemical treatment with values well below 2% by weight, the maximum value required for use as cement, being 0.10 and 0.12%, respectively, for additions of 6 and 10%, and before the treatment, the LD slags had 13% of free lime; this proves the reaction of free lime with the additive and increase of Alite formation.

EXAMPLES AND COMPARATIVE EXAMPLES

Preliminary experiments were carried out to confirm the effectiveness of the process object of this patent application. Concrete specimens obtained from cement using 10% clinker replacement with additivated steelworks slag, the compressive strength properties were determined with 1, 3, 7 and 28 days of cure according to the ABNT standard and AVCP standardization, and the results are presented in Table 7.

TABLE 7

Compressive strength of concrete specimens made with cement, in which 10% by weight of clinker was replaced with additivated steelworks slag after 1, 3, 7 and 28 days of cure.

| Concrete specimens | Blaine Specific Surface (cm²/g) | Compressive Strength after 1 day of cure (MPa) | Compressive Strength after 3 days of cure (MPa) | Compressive Strength after 7 days of cure (MPa) | Compressive Strength after 28 days of cure (MPa) |
|---|---|---|---|---|---|
| Cement without addition of slag | 4200 | 20.58 | 26.49 | 29.80 | 34.80 |
| Cement with 10% raw steel slag | 4500 | 1.38 | 15.02 | 23.48 | 31.53 |
| Cement with 10% additivated steelworks slag to 6% | 4580 | 1.68 | 18.89 | 26.94 | 37.59 |
| Cement with 10% additivated steelworks slag to 10% | 4400 | 8.71 | 21.34 | 27.25 | 35.40 |

It is noted that, as the percentage of additive increases, the strength increases, obtaining satisfactory results, fundamentally for curing times of 3, 7 and 28 days.

The invention claimed is:

1. A steelworks product obtained from steelworks slag with siliceous additives, to be applied in the partial or total replacement of the clinker, wherein the product is configured for the manufacture of cement, wherein the product contains between 38% and 47%, by weight, alite, wherein the steelworks slag contains between 6% and 10% by weight siliceous additives, and wherein less than 2% by weight free lime is obtained in the steelworks slag after thermochemical treatment.

2. The steelworks product according to claim 1, wherein the product is obtained from treating liquid steelworks slag with silica-containing additives.

3. The steelworks product according to claim 1, wherein the liquid steelworks slag is quenched.

4. The steelworks product according to claim 1, wherein the product is comminuted to a granulometry suitable for use in the production of cement.

5. The steelworks product according to claim 1, wherein the product is comminuted to a granulometry suitable for the release of different phases present in the slag, especially metallic iron.

6. A cement comprising the steelworks product of claim 1.

7. A method for producing the steelworks product according to claim 1 from steelworks slag, the method comprising the steps of:
   (a) Additivation of liquid steelworks slag with siliceous materials;
   (b) Additivation directly into the liquid steelworks slag pot;
   (c) Exploitation of the thermal input of the steel production process;
   (d) Quenching the added liquid steelworks slag;
   (e) Comminuting the solidified slag, to release the phases present;
   (f) Concentrating the additivated steelworks slag to adjust its composition; and
   (g) Comminuting the additivated steelworks slag to adjust its granulometry to cement production.

8. A cement obtainable by the method of claim 7.

* * * * *